United States Patent
Riley, Jr. et al.

[11] Patent Number: 5,445,024
[45] Date of Patent: Aug. 29, 1995

[54] AUTOMOTIVE MOTION RECORDER

[76] Inventors: Richard Krowicki, 4509 Lake Como Avenue, Metairie, La. 70006; Claude R. Riley, Jr., 121 Crowfield Rd., Knoxville, Tenn. 37922; Michael G. Sunseri, 5636 Erlanger Rd., Kenner, La. 70065

[21] Appl. No.: 72,001
[22] Filed: Sep. 7, 1993
[51] Int. Cl.⁶ .................................. G01P 15/00
[52] U.S. Cl. ............................. 73/489; 346/7; 73/9
[58] Field of Search .................. 73/9, 489, 495, 503, 73/509, 511; 346/7

[56] References Cited

U.S. PATENT DOCUMENTS

| | | | |
|---|---|---|---|
| 4,101,869 | 7/1978 | Henderson | 73/489 |
| 4,387,587 | 6/1983 | Faulconer | 73/489 |
| 4,460,902 | 7/1984 | Beckman | 346/7 |
| 4,821,218 | 4/1989 | Potsch | 73/509 |
| 4,827,438 | 5/1989 | Nickles et al. | 364/578 |
| 5,000,281 | 3/1991 | Nobumoto et al. | 364/426.02 |
| 5,056,354 | 10/1991 | Kuwana et al. | 73/9 |
| 5,065,321 | 11/1991 | Bezos et al. | 364/550 |
| 5,281,008 | 1/1994 | Kawamura et al. | 364/426.02 |

*Primary Examiner*—Robert Raevis

[57] ABSTRACT

A device is disclosed which records the information necessary for a determination of the pre-impact speeds and the impact speed of a motor vehicle involved in a collision. Following an accident, the unit may be removed and connected to a personal computer as a reader. With entry of the proper access code, the data pointer outputs the stored information in the correct sequence for analysis.

1 Claim, 1 Drawing Sheet

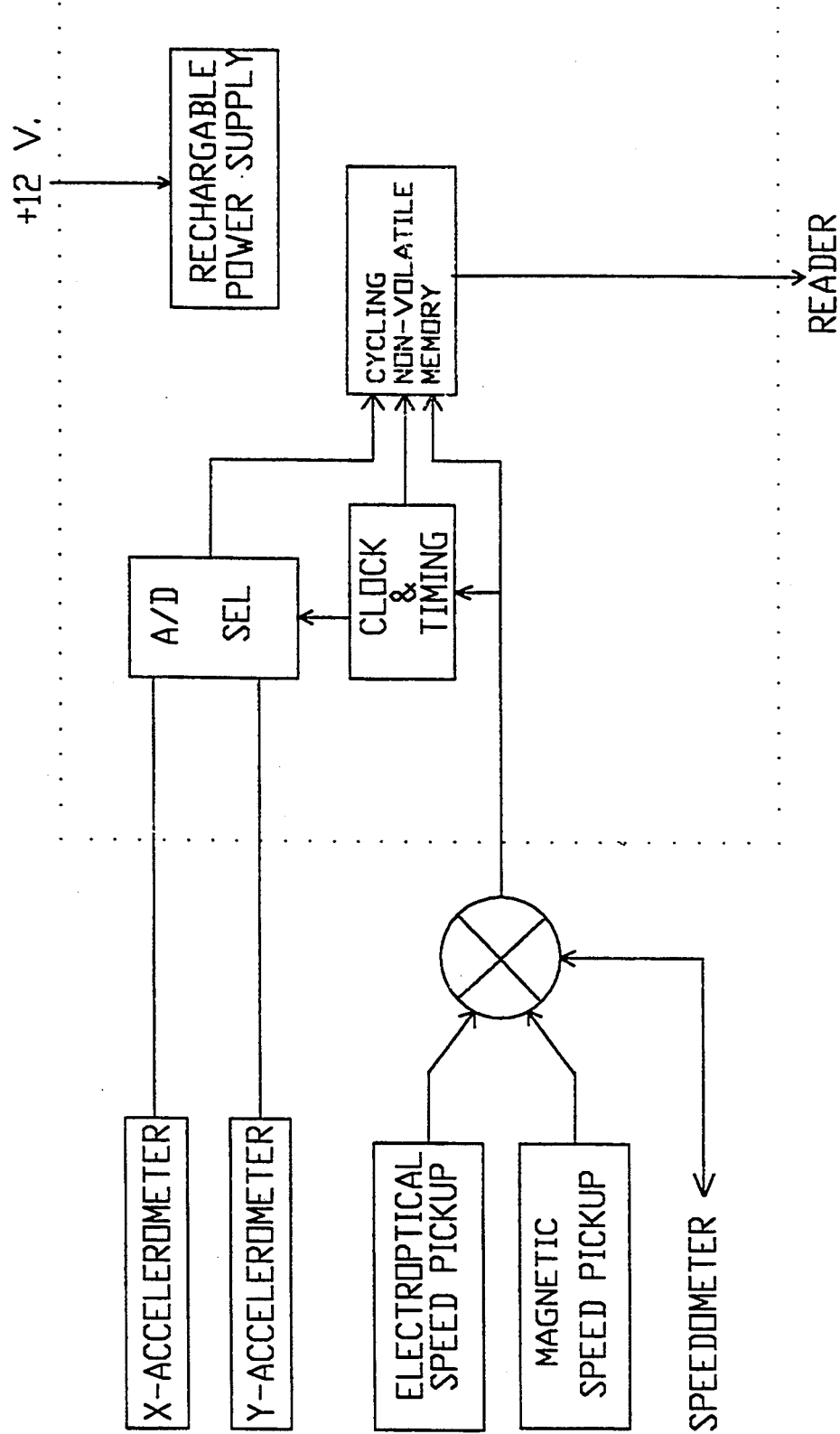

AUTOMOTIVE MOTION RECORDER

FIELD OF INVENTION

The present invention relates to the determination of speeds of vehicles involved in traffic accidents.

BACKGROUND OF INVENTION

Since the advent of antilock braking systems, traditional methods of automotive accident investigation have sometimes failed. Typically, skid marks coupled with road surface friction values and post-impact travel distances are used to reconstruct the impact speeds and pre-impact speeds of vehicles involved in traffic accidents. However, newer automobiles equipped with ABS will not typically leave discernible skid marks.

SUMMARY OF INVENTION

The present invention records information necessary for the determination of the vehicle speeds where this information might not be otherwise available. Following an accident, the unit may be removed and connected to a personal computer used a reader. With the entry of the proper access code, the data pointer outputs the stored information in the correct sequence. Using the standard equation for uniform acceleration (change in velocity divided by the time it takes to make the change) from which other equations of speed are derived, the pre-impact speeds and impact speed of the vehicle can be determined. Since there will be a non-volatile memory unit within the invention, a short speed history for the vehicle can be established.

BRIEF DESCRIPTION OF THE DRAWING

The attached drawing is a functional drawing of a proposed automotive motion recorder which will furnish necessary data to determine the speeds of accident vehicles at impact and for up to five minutes prior to impact.

The device consists of a single PC board mounted in a hardened case designed to withstand the impact of an accident. Mounted in the unit are a pair of horizontal accelerometers, one oriented in the direction of travel and the other perpendicular to the direction of travel. Also attached is a speed sensor which may be used in order to determine when to start the recording of information.

DETAILED WRITTEN DESCRIPTION

Once the unit is installed in the automobile, and the automobile has attained motion, the analog signals are converted to digital signals by an analog/digital converter. This data is gated to a circular non-volatile memory circuit. The gating is such that whenever the speed is above a preset value as determined by the accelerometers, two data streams along with the date/time stamp are stored in the memory, or if determined by the speed sensor, three data streams would be stored. The memory is sufficient to record at least the last five minutes of travel in increments of one-tenth (0.1) of a second.

The invention is directed to a method to provide impact data, comprising:

A. providing a motion recorder comprising: a case; a first accelerometer oriented to sense acceleration in the direction of vehicle travel; a second accelerometer oriented to sense acceleration perpendicular to the direction of travel; a speed sensor to sense vehicle speed; first means for transferring acceleration data from both accelerometers to a circular non-volatile memory circuit when the speed sensor senses a speed above a preset value; second means for transmitting data/time data to the memory; third means for transmitting vehicle speed data from the speed sensor to the memory; whereby the accelerometers, speed sensor, and first, second and third means are located in the case;

B. attaching the recorder to the vehicle, the vehicle further comprising either an automobile, motorcycle, truck or bus equipped with an antilock brake system; and, C. subsequent to vehicle impact, removing the recorder from the vehicle, connecting the recorder and using a predetermined access code for retrieving the acceleration data from both accelerometers, the vehicle speed and date/time data for subsequent analysis.

We claim:

1. A method to provide vehicle impact data, comprising:

A. providing a motion recorder comprising: a case; a first accelerometer oriented to sense acceleration in the direction of vehicle travel; a second accelerometer oriented to sense acceleration perpendicular to the direction of travel; a speed sensor to sense vehicle speed; first means for transferring acceleration data from both accelerometers to a circular non-volatile memory circuit when the speed sensor senses a speed above a preset value; second means for transmitting date/time data to the memory; third means for transmitting vehicle speed data from the speed sensor to the memory; whereby the accelerometers, speed sensor, and first, second and third means are located in the case;

B. attaching the recorder to the vehicle, the vehicle further comprising either an automobile, motorcycle, truck or bus equipped with an antilock brake system; and, C. subsequent to vehicle impact, removing the recorder from the vehicle, connecting the recorder and using a predetermined access code for retrieving the acceleration data from both accelerometers, the vehicle speed and date/time data for subsequent analysis.

* * * * *